No. 638,097. Patented Nov. 28, 1899.
C. W. & R. L. CLEVELAND.
CALCULATING MACHINE.
(Application filed Jan. 28, 1899.)
(No Model.) 2 Sheets—Sheet 1.
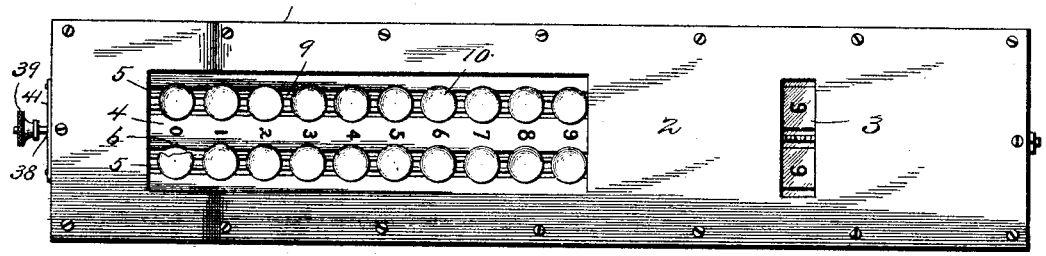
FIG. 1.
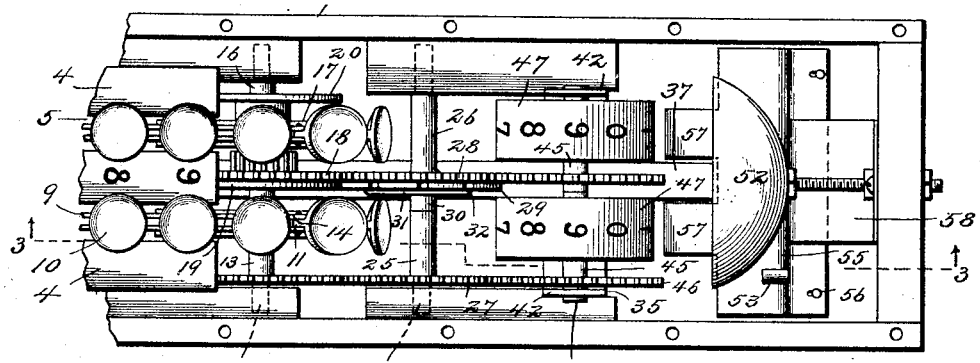
FIG. 2.
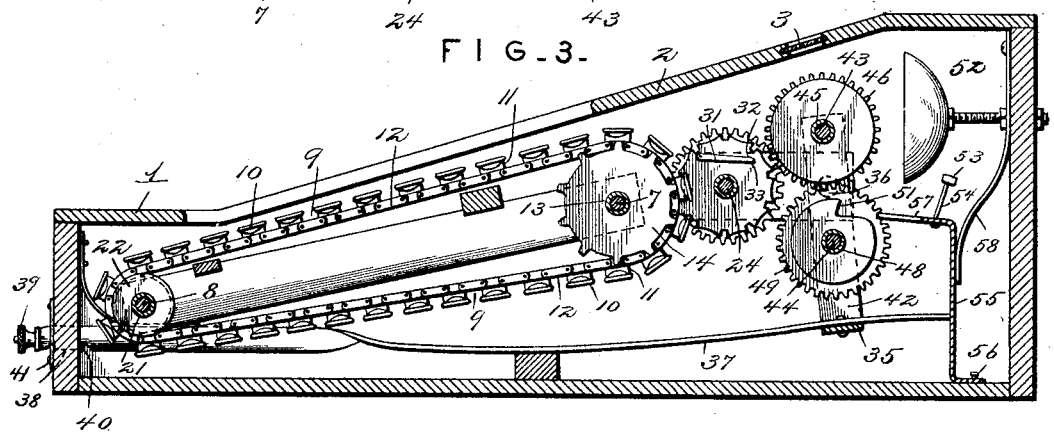
FIG. 3.
FIG. 9. FIG. 10.
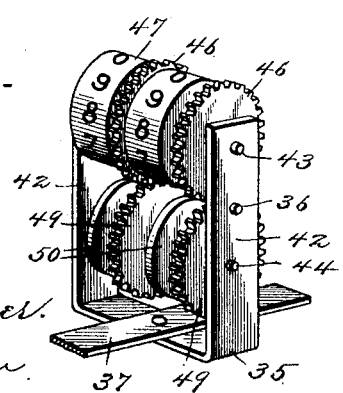
Witnesses
Harry L. Ames
R. A. Nau
Inventors
Rienzi L. Cleveland
Carr W. Cleveland
By V. D. Stockbridge
His Attorney
THE NORRIS PETERS CO., PHOTO-LITHO., WASHINGTON, D. C.

No. 638,097. Patented Nov. 28, 1899.
C. W. & R. L. CLEVELAND.
CALCULATING MACHINE.
(Application filed Jan. 28, 1899.)
(No Model.) 2 Sheets—Sheet 2.
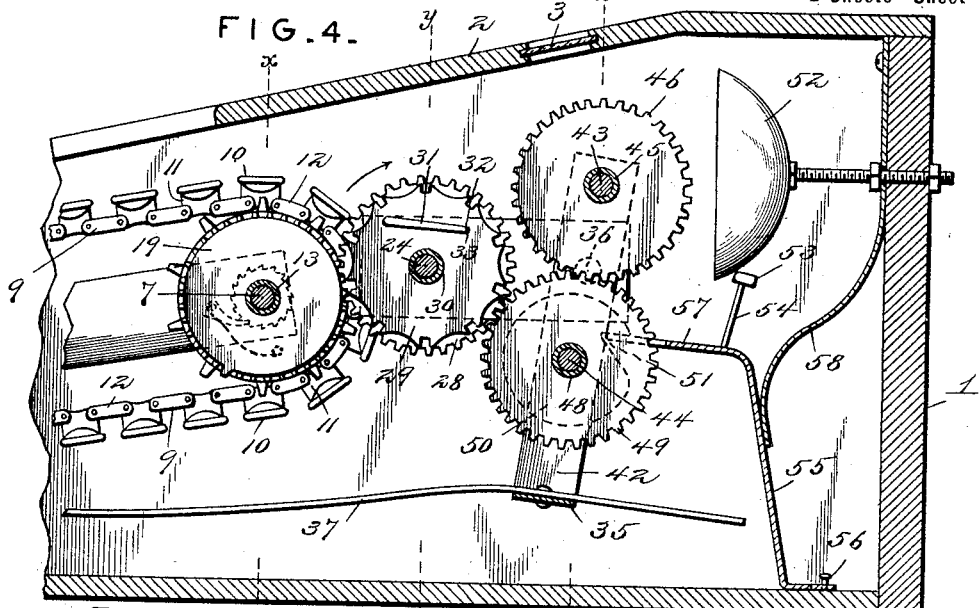
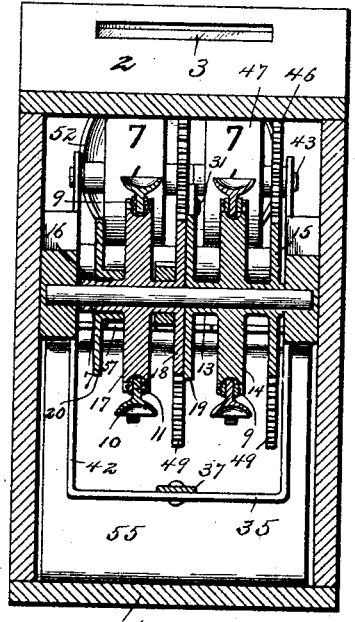
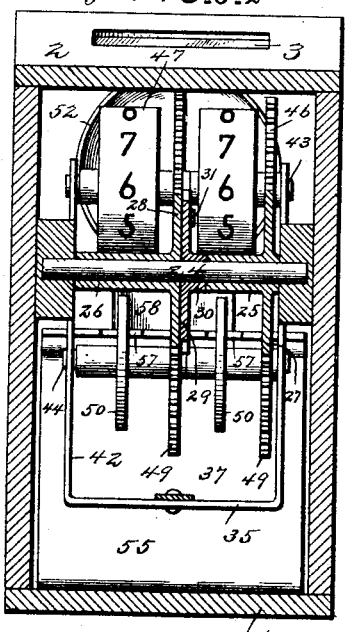
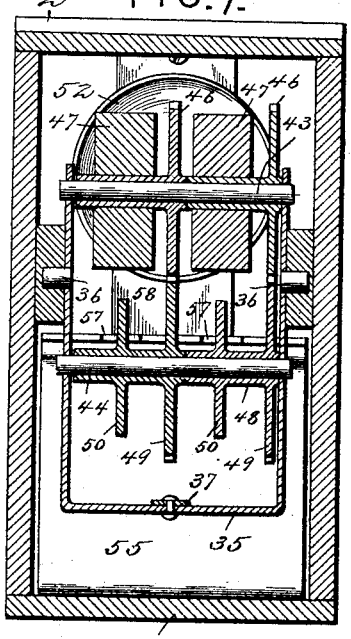
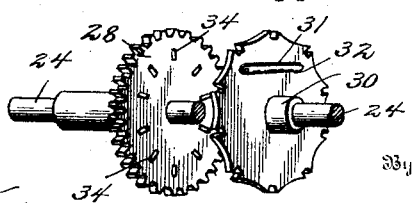
Witnesses
Harry L. Ames.
K. A. Nau.
Inventors
Rienzi L. Cleveland and
Carr W. Cleveland.
By V. D. Stockbridge
His Attorney

UNITED STATES PATENT OFFICE.

CARR W. CLEVELAND AND RIENZI L. CLEVELAND, OF DEVILS LAKE, NORTH DAKOTA.

CALCULATING-MACHINE.

SPECIFICATION forming part of Letters Patent No. 638,097, dated November 28, 1899.

Application filed January 28, 1899. Serial No. 703,695. (No model.)

*To all whom it may concern:*

Be it known that we, CARR W. CLEVELAND and RIENZI L. CLEVELAND, citizens of the United States, residing at Devils Lake, in the county of Ramsey and State of North Dakota, have invented certain new and useful Improvements in Calculating-Machines; and we do hereby declare the following to be a full, clear, and exact description of the invention, such as will enable others skilled in the art to which it appertains to make and use the same.

This invention relates to calculating-machines, and is designed to facilitate the operations of addition and subtraction. The mechanism employed in the construction of the machine after being used for adding up, for instance, the debit side of a ledger is then reversed and the credit side is added up. When a balance is struck, a bell or alarm rings automatically to give warning that a balance has been struck, and after this the mechanism may again be reversed and the adding up of the credits proceeded with until the desired result is attained.

A further object of the invention is to simplify and improve the construction of machines heretofore employed for a similar purpose by dispensing almost entirely with small springs, catches, pawls, &c., which render the machine as a whole liable to get out of order. This renders the machine cheaper to manufacture, imparts to it greater durability, and also renders the machine perfectly reliable in operation, so that it is impossible to make a mistake in the operations of addition and subtraction.

The detailed objects and advantages of the invention will be pointed out in the course of the subjoined description.

The invention consists in a calculating-machine embodying certain novel features and details of construction and arrangement of parts, as hereinafter fully described, illustrated in the drawings, and incorporated in the claims.

In the accompanying drawings, Figure 1 is a plan view of a calculating-machine constructed in accordance with the present invention. Fig. 2 is an enlarged plan view of one end of the casing with the top removed, so as to show the mechanism which operates the registering-wheels, said view also showing the alarm which is sounded when a balance is struck. Fig. 3 is a vertical longitudinal section through the machine, taken about in line with one of the chains of finger-pieces or on line 3 3 of Fig. 2. Fig. 4 is an enlarged vertical longitudinal section through one end of the machine, showing the main sprocket-wheel shaft, the adding-wheel shaft, the registering-wheel shaft, the reversing-wheel shaft, the alarm mechanism, and the parts operatively related thereto. Fig. 5 is a transverse section through the machine in line with the main sprocket-wheel shaft on line $xx$ of Fig. 4. Fig. 6 is a similar section in line with the adding-wheel shaft on line $yy$ of Fig. 4. Fig. 7 is a similar view taken in line with the registering-wheel shaft and reversing-wheel shaft on line $zz$ of Fig. 4. Fig. 8 is a detail perspective view of the notched adding-wheel and the adjacent gear on the adding-wheel shaft, said view showing the automatic engaging and releasing means by which said wheels are thrown into and out of engagement. Fig. 9 is a detail perspective view showing the reversing-frame with its shafts, wheels, and operating devices. Fig. 10 is a fragmentary perspective view of one of the chains of finger-pieces, showing also a portion of one of the sprocket-wheels.

Similar numerals of reference designate corresponding parts in all the figures of the drawings.

The calculating-machine contemplated in this invention comprises a suitable casing 1, in which the operative parts of the machine are mounted. This casing has an inclined top 2, provided with an observation-opening 3, covered with glass, through which the figures on the registering-wheels may be read. The front portion of the top of the casing is covered by a face-plate 4, having a plurality of longitudinal slots or ways 5, along which the movable finger-pieces hereinafter described travel. Between the slots 5 the plate 4 has represented thereon numerals ranging from "0" to "9," inclusive, the "0" being nearest the operator and the numeral "9" farthest from said operator. In transverse alinement with the numeral "0" the face-plate 4 is provided at the sides of the slots 5 with recesses or depressions 6, into which the finger-pieces are pressed by the operator's fingers for the purpose of arresting the movements of the finger-pieces and chains at the proper point, thereby preventing any possibility of the chains and finger-pieces moving too far. At the opposite ends of the plate 4 and beneath the same are a main sprocket-wheel shaft 7 and a second or auxiliary sprocket-wheel shaft 8, and secured loosely upon each shaft are sprocket-wheels, around which endless chains 9 pass. Each chain is provided with a series of cup-shaped or concavo-convex finger-pieces 10, each of which has an inwardly-extending shank 11. The shanks 11 form certain links or parts of the chains, the shank of one finger-piece being connected to the shank of the adjoining finger-piece by means of parallel links 12, arranged on opposite sides of the shanks and pivotally connected thereto. The rounded or hemispherical inner or under sides of the finger-pieces 10 slide in contact with the edges of the slots 5, and as each finger-piece comes in contact with the face-plate 4 at only two points there is very little frictional resistance to the movements of the finger-pieces along the face-plate. The upper or outer concave sides of the finger-pieces enable the operator's fingers to be placed thereon, at the same time giving sufficient frictional engagement with the finger to enable the chain and mechanism connected therewith to be operated when the finger-piece is drawn toward the front of the casing.

Mounted on the main sprocket-wheel shaft 7 is a sleeve 13, which turns loosely on said shaft and which has rigidly mounted thereon a primary sprocket-wheel 14, around which the chain passes, and also a primary gear-wheel 15. On the same shaft, at one side of the sleeve 13, is a second sleeve 16, on which are rigidly mounted a secondary sprocket-wheel 17 and also a secondary gear-wheel 18. Mounted fast on the sleeve 13 is a one-tooth adding-wheel 19, and a similar wheel 20 is fast on the second sleeve 16. The purpose of these single-tooth adding-wheels will hereinafter appear. On the second sprocket-wheel shaft 8 is loosely mounted a pair of sleeves 21, each of which has rigidly mounted thereon a pulley or sprocket-wheel 22, around which one of the chains passes at the front end of the casing. Each sprocket-wheel 14 and 17 has a centrally-located annular groove in its periphery, in which the shanks of the finger-pieces are received, and each sprocket-wheel has two sets of sprocket-teeth 23, one set at each side of the wheel, the arrangement being such that the two sets of sprocket-teeth come exactly opposite each other or in transverse alinement and enter between the adjacent ends of the links 12, while they straddle or lie on opposite sides of the shanks 11 of the finger-pieces 10. This gives a positive and reliable engagement between the sprocket-wheels and the chains which travel thereon.

Mounted in rear of the main sprocket-wheel shaft 7 is an adding-wheel shaft 24, parallel to the shaft 8 and having loosely mounted thereon sleeves 25 and 26. Mounted fast on the sleeve 25 is a gear-wheel 27, which is in constant mesh with the gear-wheel 15 on the shaft 7. On the other sleeve 26 is a gear-wheel 28, which is in constant mesh with the gear-wheel 18 on the shaft 7. Adjacent to the gear-wheel 28 is a notched adding-wheel 29, having ten notches therein adapted to be engaged successively by the single tooth on the wheel 19 on the sprocket-wheel shaft. The notched wheel 29 is mounted fast on a sleeve 30, which rotates loosely on the adding-wheel shaft 24. Secured to the side face of the wheel 29 is a spring-dog 31, the same being fast at one end and having its other end bent at an angle, as shown at 32, said end passing through an opening 33 in the wheel 29 and adapted to engage with any one of a series of ten sockets or notches 34 in the adjacent face of the gear-wheel 28. The construction and arrangement of the spring-dog 31 and the notches or sockets 34 are such that when the adding-wheel 29 is rotated said dog will engage the gear-wheel 28 and turn the same through the same part of a revolution that the notched adding-wheel itself is turned. The construction also enables the gear-wheel 28 when turned to free itself from the dog 31, and thus rotate independently of the adding-wheel 29.

The first row of finger-pieces represents the digits or numerals from "1" to "9," inclusive, while the second row represents tens, the third row hundreds, and so on, according to the number of chains of finger-pieces employed, it being understood that the adding mechanism is increased in proportion to the number of chains employed. By the construction hereinabove described when a finger-piece is moved ten spaces on the face-plate 4 one complete revolution is given to the gear-wheels 15 and 27, while the notched adding-wheel 29 and the gear-wheel 28 are turned one-tenth of a revolution by reason of the engagement of the single tooth on the wheel 20 with one of the notches in the adding-wheel 31. When the single-tooth adding-wheel 20 has been turned through ten revolutions, the ten-notched adding-wheel 29 will have been turned one complete revolution.

Mounted in the farther or rear end of the casing 1 is a vertically-disposed reversing-frame 35, which is fulcrumed at an intermediate point 36 and operated or swung by means of the reversing or operating bar 37, which extends under the mechanism hereinabove described, along the bottom of the casing and toward the front thereof, passing out through an opening 38 in the front of the casing, where it is provided outside of the casing with a knob or finger-piece 39, by which the bar 37 may be pushed inward and drawn outward. The bar 37 is provided on its edge with teeth or notches, forming shoulders 40, which may be brought into engagement with the front of the casing or with a plate 41, fast thereon, so as to hold the bar 37 either in its inward or outward position.

The frame 35 comprises parallel side bars 42, in the upper ends of which is mounted a registering-wheel shaft 43. The registering-wheel shaft 43 is above the fulcrum 36, while beneath the fulcrum is a reversing-wheel shaft 44. As the frame 35 is swung in one direction one of the shafts 43 or 44 is moved nearer to the adding-wheel shaft 24, while the other shaft is moved away from the same, and vice versa. Mounted loosely on the shaft 43 are sleeves 45, each of which carries a gear-wheel 46 and a registering-wheel 47, the latter having a periphery broad enough to receive or have represented thereon the digits and all of the registering-wheels being arranged beneath the observation-opening 3 or in such relation thereto that the numerals may be read through said opening. The gear-wheels 46 are arranged in longitudinal alinement with the gear-wheels on the adding-wheel shaft, so that they may be thrown into and out of mesh therewith by operating the reversing-frame 35. Mounted on the reversing-wheel shaft 44 are sleeves 48, each of which has fast thereon a gear-wheel 49, in line with one of the gear-wheels on the adding-wheel shaft 24, and a disk 50, provided with a peripheral notch or recess 51, the purpose of which will hereinafter appear.

By the construction just hereinabove described it will be seen that when the reversing frame 35 is rocked in one direction the gear-wheels on the registering-wheel shaft will be thrown into mesh with the gear-wheels on the adding-wheel shaft, and when said frame 35 is rocked in the opposite direction the wheels 46 will be thrown out of mesh and the gear-wheels 49 on the reversing-wheel shaft will be thrown into mesh with the gear-wheels on the adding-wheel shaft. The effect of this is of course to rotate the registering-wheels 47 in one direction or the other, according to whether it is desired to use the machine for adding or subtracting.

Arranged in the rear part of the casing is an alarm bell or gong 52, adapted to be struck by a hammer 53, attached by a stem 54 to a controller 55. The controller is shown in the form of a plate connected loosely or pivotally at its bottom, as shown at 56, within the casing and extending upward, said controller being provided at its upper end or edge with a series of laterally-projecting fingers 57, one for each notched disk 50. The controller plate is urged toward the notched disks 50 by means of one or more springs 58, located behind and bearing against said controller. The peripheries of the disks 50 act upon the fingers 57 of the controller, so as to hold the controller and hammer away from the alarm-bell 52; but when the notches 51 in the disks 50 are brought into transverse alinement with each other all of the fingers 57 may enter the notches 51, the spring or springs 58 acting upon the controller-plate so as to force the fingers into the notches in a manner which will be readily understood. It will also be understood that the notches 51 are never brought into alinement with each other so as to receive the fingers 57 until a balance is reached or, in other words, until all of the ciphers on the registering-wheels are brought beneath the observation-opening in the top of the casing. When the notches 51 are brought into alinement, the spring 58 quickly thrusts the controller toward the disks and causes the hammer 53 to impinge against the alarm-bell, thus notifying the operator that a balance has been reached.

The operation will be readily understood from the foregoing description. If, for instance, it is desired to add up the debit side of a ledger and to find the difference between the debits and credits, the registering-wheels are set at "0" and the reversing-bar 37 is pushed rearward, so as to throw the registering-wheel shaft directly into gear with the adding-wheel shaft. The various amounts are now added up by operating the finger-pieces. If, for instance, nine cents is to be added, the finger is placed on the finger-piece opposite the numeral "9" in the first column on the face-plate and moved toward the operator until it enters the depressions 6 in the face-plate opposite the cipher. Should the next amount to be added be fifty cents, the operator places his finger on the finger-piece opposite "5" in the second column and moves said finger-piece until it reaches the cipher on the front of the casing, and so on. After the debit side of the ledger has been added up the reversing-bar is drawn outward, which throws the reversing-wheel shaft into gear with the adding-wheel shaft. The same operation is proceeded with now until all the credits have been dealt with, whereupon by glancing through the observation-opening the difference between the debits and credits may be observed. Should the credit side of the ledger exceed the debit side, the bell will ring the moment a balance is struck. The operator as soon as a balance is struck pushes the reversing-bar again inward and proceeds as before, thus adding up the credits, and when all the credits have been dealt with by looking through the observation-opening the excess of credits over debits may be noted.

It will of course be understood that the number of chains of finger-pieces and corresponding operative parts of the machine may be increased according to the desire of the manufacturer or the needs of the user. It will also be noted that small parts—such as springs, pawls, and other devices which render the machine liable to get out of order—have been dispensed with and a machine of great simplicity, durability, and reliability produced.

Having thus described the invention, what is claimed as new, and desired to be secured by Letters Patent, is—

1. In a calculating-machine, in combination, registering-wheels, operating mechanism therefor, reversing and constantly-intermeshing gear-wheels, and means for throwing said wheels into and out of gear with the adding and subtracting mechanism.

2. In a calculating-machine, in combination, registering-wheels, operating mechanism therefor, a pivoted reversing-frame, constantly-intermeshing reversing-wheels carried thereby, and a bar for operating said frame.

3. In a calculating-machine, in combination, registering-wheels, operating mechanism therefor, constantly-intermeshing reversing gear-wheels, a medially-pivoted reversing-frame, and means for rocking said frame.

4. In a calculating-machine, in combination, registering-wheels, operating mechanism therefor, constantly-intermeshing reversing gear-wheels, a reversing-frame pivoted intermediate its ends, a reversing-bar, and means for holding said bar.

5. In a calculating-machine, the combination with an endless chain, of concavo-convex finger-pieces connected thereto, and a face-plate having a slot traversed by the finger-pieces, the convex faces of the finger-pieces bearing against the said face-plate.

6. In a calculating-machine, the combination with a slotted and recessed face-plate, of an endless chain consisting of finger-pieces provided with shanks, and links joining said shanks and pivotally connected thereto.

7. In a calculating-machine, an endless chain composed of finger-pieces having shanks, and parallel links connecting said shanks on opposite sides, in combination with a sprocket-wheel having two sets of teeth, oppositely located in transverse alinement with each other so as to engage on opposite sides of the shanks and enter between the adjacent ends of the links, substantially as described.

8. In a calculating-machine, the combination with the adding-wheel shaft, of a gear-wheel loosely mounted thereon, an adding-wheel also loose on said shaft, and a spring-dog carried by the adding-wheel and designed to automatically engage and be disengaged from said gear-wheel.

In testimony whereof we affix our signatures in presence of two witnesses.

CARR W. CLEVELAND.
RIENZI L. CLEVELAND.

Witnesses:
D. G. DUELL,
M. B. CLEVELAND.